United States Patent [19]

Oishi

[11] Patent Number: 4,698,715

[45] Date of Patent: Oct. 6, 1987

[54] MAGNETIC RECORDING DISK HAVING CENTER CORE SECURED BY A BASE-LESS DOUBLE-SIDED ADHESIVE TAPE

[75] Inventor: Kengo Oishi, Odawara, Japan

[73] Assignee: Fuji Photo Film Co., Ltd., Japan

[21] Appl. No.: 669,458

[22] Filed: Nov. 7, 1984

[30] Foreign Application Priority Data

Nov. 16, 1983 [JP] Japan ............................ 58-177351[U]

[51] Int. Cl.$^4$ .......................... G11B 23/03; G11B 5/82
[52] U.S. Cl. ..................................... 360/133; 360/135
[58] Field of Search ................ 360/133, 135; 369/282, 369/287, 289, 290; 206/312, 313, 444; 428/343

[56] References Cited

U.S. PATENT DOCUMENTS 4,185,314 1/1980 Hatchett et al. .................... 360/133
4,544,977 10/1985 Ozawa et al. ....................... 360/133

FOREIGN PATENT DOCUMENTS 52-73717 6/1977 Japan .................................. 206/312

Primary Examiner—Stuart N. Hecker
Assistant Examiner—Benjamin E. Urcia
Attorney, Agent, or Firm—Pasquale A. Razzano

[57] ABSTRACT

A magnetic recording disk cartridge comprises a cartridge casing and a magnetic recording disk accommodated therein for rotation. The magnetic recording disk consists of an annular magnetic recording medium and a center core secured thereto at the center thereof. The center core has an upper half and a lower half secured together sandwiching therebetween the magnetic recording medium. A base-less double-sided adhesive tape which consists only of an adhesive layer and has no base material is sandwiched between the magnetic recording medium and the lower half of the center core to positively secure the former to the latter.

2 Claims, 3 Drawing Figures

MAGNETIC RECORDING DISK HAVING CENTER CORE SECURED BY A BASE-LESS DOUBLE-SIDED ADHESIVE TAPE

BACKGROUND OF THE INVENTION

1. Field of the Invention

This invention relates to a magnetic recording disk comprising a cartridge casing and a magnetic recording disk accommodated therein for rotation, the magnetic recording disk consisting of an annular magnetic recording medium and a center core secured to the recording medium at the center thereof.

2. Description of the Prior Art

Magnetic recording disks are widely used as sound and/or video recording media in computers, word-processors and the like. Recently, a miniaturized magnetic recording disk sometimes referred to as a "micro floppy disk" is used in a so-called electronic camera instead of silver salt film. Especially in the miniaturized magnetic recording disk cartridge, the recording density has to be very high since a large amount of information must be recorded on a small recording medium. Therefore, slight deformation of the recording medium or slight displacement of the recording medium relative to the center core with which the driving mechanism of the recording/reproducing system is engaged can adversely affect recording and/or reproduction of information.

As shown in FIG. 1, the magnetic recording disk 1 generally comprises an annular magnetic recording medium 2 formed of an annular flexible base sheet having a central opening 2a and bearing thereon a magnetic recording layer, and a center core attached to the recording medium 2 concentrically with the central opening 2a. The center core comprises an upper half 3 and a lower half 4 secured together by means of, for instance, ultrasonic welding so as to sandwiched therebetween the magnetic recording medium 2 with a resilient ring 5 intervening between the upper half 3 and the upper surface of the recording medium 2. Displacement of the recording medium 2 with respect to the center core in the circumferential direction thereof is limited by surface friction of the resilient ring 5. However this method of securing the center core to the magnetic recording medium has been found to be disadvantageous in that the resilient ring 5 is strained upon ultrasonic welding, whereby deformation such as warpage is generated in the recording medium 2 or the recording medium is displaced in the circumferential direction with respect to the center core. In order to solve this problem, it has been proposed to secure the recording medium 2 to the lower half 4 of the center core by applying double-sided adhesive tape therebetween instead of disposing the resilient ring 5 between the upper half 3 and the recording medium 2. This method is advantageous in that the problem that positioning of parts in assembly is difficult due to the fact that the parts are light in weight and small in size is solved, thereby permitting automated assembly of the magnetic recording disk cartridge. On the other hand, it is disadvantageous in that the standard of 0.5±0.02 mm for the distance between the upper surface of the recording medium 2 and the lower surface of the flange 4a of the lower half 4 cannot be satisfied since the double-sided adhesive tape is of an unwoven fabric impregnated with adhesive and has a thickness of 50 to 150 μm.

SUMMARY OF THE INVENTION

In view of the foregoing observation and description, the primary object of the present invention is to provide a magnetic recording disk cartridge which is simple in structure, can meet the standard for the distance between the upper surface of the recording medium and the lower surface of the flange of the lower half of the center core, and is free from deformation or displacement of the recording medium.

In accordance with the present invention, an annular "base-less" double-sided adhesive tape is transferred to the upper surface of the flange of the lower half of the center core, and the upper half and the lower half of the center core are secured together sandwiching therebetween the recording medium with the base-less double-sided adhesive tape intervening between the upper surface of the lower half and the recording medium.

The base-less double-sided adhesive tape consists only of an adhesive layer and has no base sheet such as the unwoven fabric in ordinary double-sided adhesive tape, and accordingly is very small in thickness (e.g., about 10 μm) so that said standard for the distance between the upper surface of the recording medium and the lower surface of the flange of the lower half of the center core can be easily satisfied. Further, with this arrangement, the recording medium can be positively secured to the center core without use of the resilient ring conventionally used for fixing the recording medium with respect to the center core, thereby facilitating automated assembly of the magnetic recording disk cartridge and lowering the manufacturing cost thereof. Such base-less double-sided adhesive tape is available, for example, from Nitto Denko in Japan (e.g. #593).

DESCRIPTION OF THE PREFERRED EMBODIMENT

Figure 1:
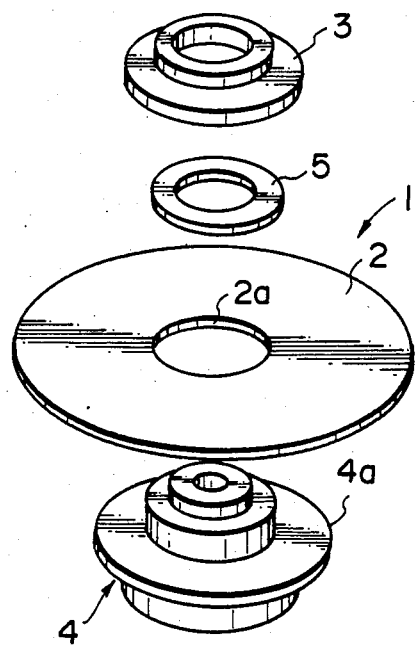
FIG. 1 is an exploded perspective view showing a magnetic recording disk of a magnetic recording disk cartridge in accordance with prior art.
Figure 2:
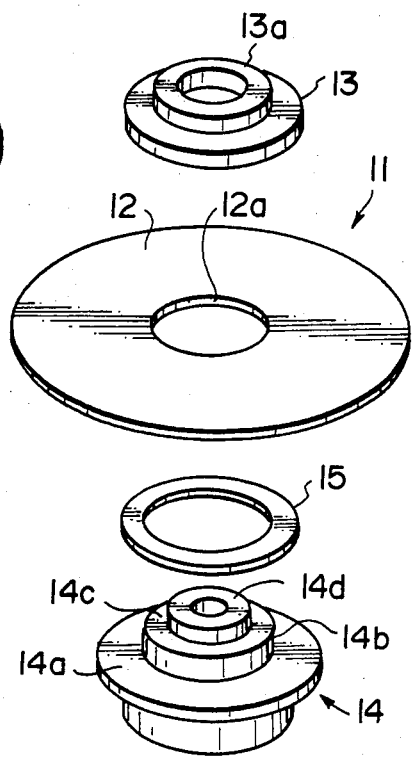
FIG. 2 is an exploded perspective view showing a magnetic recording disk of a magnetic recording disk cartridge in accordance with an embodiment of the present invention.
Figure 3:
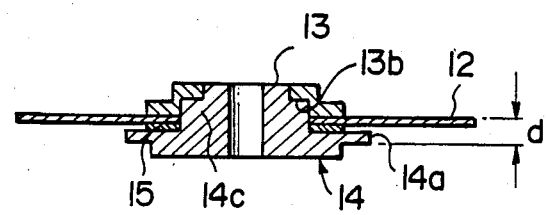
FIG. 3 is a cross-sectional view of the magnetic recording disk of FIG. 2 but in the assembled state.

In FIG. 2, a magnetic recording disk 11 in accordance with an embodiment of the present invention comprises a flexible magnetic recording disk 12 which is annular in shape and provided with a central opening 12a, and a center core attached to the recording medium 12 concentrically with the central opening 12a. The center core comprises a upper half 13 and an lower half 14. The upper half 13 has a central opening 13a and an inner shoulder 13b (FIG. 3). The lower half 14 has an annular flange 14a, a cylindrical projection 14b which coaxially stands from the flange 14a and is adapted to be snugly fit into the central opening 12a of the recording medium 12, and a cylindrical tip portion 14d which coaxially stands from the projection 14b and has a diameter smaller than the projection 14b with a shoulder 14c formed therebetween. An annular base-less double-sided adhesive tape (#593 sold by Nitto Denko) 15 is transferred onto the upper surface of the flange 14a coaxially therewith. The upper half 13 and the lower half 14 of the center core are engaged with each other sandwiching therebetween the magnetic recording medium 12 with the lower surface of the recording medium 12 resting on the base-less double-sided adhesive tape 15, the cylindrical projection 14b being snugly fit into the central opening 12a of the recording medium, the lower surface of the upper half 13 resting on the upper surface of the recording medium 12, the inner shoulder 13b resting on the shoulder 14c, and the tip portion 14d being snugly fit into the central opening 13a of the upper half 13 as shown in FIG. 3. The upper half 13 and the lower half 14 are secured together by means of ultrasonic welding, caulking or the like. In this magnetic recording disk 11, the recording medium 12 is secured to the center core by means of the base-less double-sided adhesive tape 15. The base-less double-sided adhesive tape 15 is very small in thickness, for instance about 10 $\mu$m thick, and accordingly, the distance d between the upper surface of the recording medium 12 and the lower surface of the flange 14a of the lower half 14 can be easily made to meet the standard of 0.5±0.02 mm.

What is claimed is:

1. A magnetic recording disk assembly comprising a magnetic recording disk adapted for rotation in a casing, a center core disposed near the center of the recording disk, the core comprising a first half and a second half secured together and sandwiching therebetween the magnetic recording disk, the second half being secured to the magnetic recording disk by means of a base-less double-sided adhesive tape sandwiched between the recording disk and the second half of the center core.

2. The magnetic recording disk assembly as defined in claim 1 wherein said base-less double sided adhesive tape has a thickness of approximately 10 $\mu$m or less.

* * * * *